US012756359B2

(12) United States Patent
Stenzel et al.

(10) Patent No.: US 12,756,359 B2
(45) Date of Patent: Oct. 6, 2026

(54) METHOD FOR REPAIRING AND/OR OPTIMIZING A SOLAR MODULE

(71) Applicant: HANWHA Q CELLS GMBH, Bitterfeld-Wolfen (DE)

(72) Inventors: Florian Stenzel, Bitterfeld-Wolfen (DE); Ansgar Mette, Bitterfeld-Wolfen (DE); Stefan Hörnlein, Bitterfeld-Wolfen (DE)

(73) Assignee: HANWHA Q CELLS GMBH, Bitterfeld-Wolfen (DE)

( * ) Notice: Subject to any disclaimer, the term of this patent is extended or adjusted under 35 U.S.C. 154(b) by 287 days.

(21) Appl. No.: 18/704,241

(22) PCT Filed: Oct. 25, 2022

(86) PCT No.: PCT/DE2022/100792
§ 371 (c)(1),
(2) Date: Sep. 12, 2024

(87) PCT Pub. No.: WO2023/072342
PCT Pub. Date: May 4, 2023

(65) Prior Publication Data

US 2026/0019032 A1 Jan. 15, 2026

(30) Foreign Application Priority Data

Oct. 25, 2021 (DE) ..................... 10 2021 127 661.6

(51) Int. Cl.
*H02S 50/15* (2014.01)

(52) U.S. Cl.
CPC .................................... *H02S 50/15* (2014.12)

(58) Field of Classification Search
CPC .......... H02S 50/15; H02S 50/10; H02S 50/00; H02S 10/00; H02S 20/25; H02S 20/10; H02S 20/32; H02S 40/34; H02S 40/36; H02S 40/30; H02S 40/32; H10F 77/211; G01N 21/6489; G01N 21/66;
(Continued)

(56) References Cited

U.S. PATENT DOCUMENTS 3,708,669 A * 1/1973 Work .................. G01R 35/005 136/290
2007/0029468 A1* 2/2007 Sinton ..................... H02S 50/10 250/214 R
(Continued)

FOREIGN PATENT DOCUMENTS

DE 10 2016 009 560 A1 2/2018
WO WO 2016/153433 A1 9/2016

*Primary Examiner* — David J Makiya
*Assistant Examiner* — Soorena Kefayati
(74) *Attorney, Agent, or Firm* — Christensen, Fonder, Dardi & Busse PLLC; John P. Fonder

(57) ABSTRACT

A method for repairing and/or optimizing a solar module having a sun-facing front and a sun-averted back, a multiplicity of solar cells being encapsulated between the front and the sun-averted back, the method having the following steps: a) providing a solar module, b) applying a voltage to the provided solar module in the reverse direction, c) locally illuminating and scanning the front of the solar module to which the voltage is applied with a point light source, with the result that a flow of current flows through the solar cells encapsulated in the solar module.

14 Claims, 3 Drawing Sheets

(58) Field of Classification Search
CPC ............. G01N 21/6456; G01N 21/646; G01N 21/9501; G01N 21/956; G01N 21/68; G01N 21/67; G01N 21/63
See application file for complete search history.

(56) References Cited

U.S. PATENT DOCUMENTS

| | | | | |
|---|---|---|---|---|
| 2009/0127448 | A1* | 5/2009 | Fuyuki | H02S 50/10 250/238 |
| 2010/0182421 | A1* | 7/2010 | Chidambaram | G01N 21/66 348/126 |
| 2012/0056181 | A1* | 3/2012 | Kamata | H10F 77/211 257/734 |
| 2015/0168303 | A1* | 6/2015 | Trupke | G01R 31/2656 324/762.01 |
| 2016/0056761 | A1* | 2/2016 | Mabille | G01N 21/9505 356/237.1 |
| 2016/0126406 | A1* | 5/2016 | Uzu | H10F 10/166 438/98 |
| 2016/0218670 | A1* | 7/2016 | Johnston | G01N 21/63 |
| 2018/0019594 | A1* | 1/2018 | Min | G01W 1/02 |
| 2018/0076348 | A1* | 3/2018 | Rehder | H02S 40/34 |
| 2018/0102735 | A1* | 4/2018 | Nam | H02S 40/32 |
| 2018/0159469 | A1* | 6/2018 | Trupke | H02S 50/15 |
| 2018/0262159 | A1* | 9/2018 | Deceglie | G01N 21/66 |
| 2019/0237604 | A1* | 8/2019 | Detrick | H02S 20/23 |
| 2019/0371949 | A1* | 12/2019 | Ahn | H10F 19/00 |
| 2020/0159204 | A1* | 5/2020 | Calo Lopez | H02S 50/00 |
| 2020/0328313 | A1* | 10/2020 | Gibson | H02S 30/00 |
| 2021/0288208 | A1* | 9/2021 | Hongming | H10F 10/14 |

* cited by examiner

METHOD FOR REPAIRING AND/OR OPTIMIZING A SOLAR MODULE

RELATED APPLICATIONS

The present application is a National Phase entry of PCT Application No. PCT/DE2022/100792, filed Oct. 25, 2022, which claims priority to German Patent Application No. 10 2021 127 661.6, filed Oct. 25, 2021, the disclosures of which are hereby incorporated by reference herein in their entirety.

FIELD OF THE INVENTION

The invention relates to a method for repairing and/or optimizing a solar module. A solar module customarily comprises a sun-facing front, a sun-averted back, and a multiplicity of solar cells that are encapsulated between the front and the sun-averted back. The solar cells are electrically interconnected. The solar cells customarily comprise a substrate, which is at least coated with a conductive front-surface layer, a front-surface electrode and a back-surface electrode, but can optionally comprise further intermediate layers. Independently of the number of intermediate layers, the front-surface electrode electrically contact-connects the conductive front-surface layer, in order to ensure the operation of the solar cell. The front of the solar cell is the side upon which light falls during the operation of the solar cell, whereas the back of the solar cell, during the operation of the solar cell, constitutes the light-averted side of the solar cell.

The substrate is formed of a semiconductor material such as, for example, silicon, whereas the electrodes are comprised of metals. The electrodes are formed, for example, by the screen-printing and subsequent firing of a metal paste. In particular, the front-surface electrode can be configured in the form of a metal-based digit electrode or a contact grid, whereas the back-surface electrode, in particular, can be configured in the form of a full-surface metal-based layer. The conductive front-surface layer, for example, is an emitter layer of the solar cell.

The metal-semiconductor contact of a solar cell substantially dictates the electrical properties of a solar cell. A method is known from DE 10 2018 001 057 A1 for improving the ohmic contact performance between a contact grid and an emitter layer of a solar cell. This method comprises the following:

- providing a silicon solar cell, having an emitter layer, a contact grid and a return contact;
- electrical connection of the contact grid to one pole of a voltage source and of the return contact by means of a contact device which is electrically connected to the other pole of the voltage source;
- by means of the voltage source, applying a voltage in a reverse direction to the forward direction of the silicon solar cell, which is quantitatively lower than the breakdown voltage of the silicon solar cell; and
- directing a point light source towards the sun-facing side of the silicon solar cell during the application of this voltage, such that a section of a subregion of the sun-facing side is illuminated, thereby inducing a current flux in said subregion which, vis-à-vis this section, assumes a current density of 200 $A/cm^2$ to 20,000 $A/cm^2$, and which acts on the subregion for between 10 ns and 10 ms.

By this method, faulty contact regions in the metal paste associated with the defective execution of processes during the firing of the metal paste are compensated, such that solar cells nevertheless achieve an optimum serial resistance for their design and, moreover, even in the event of emitter layers having high sheet resistances, a highly effective ohmic contact performance is achieved between the contact grid and the emitter layer, such that process steps required for the configuration of a selective emitter can be omitted. The method is therefore provided as an element of a method for manufacturing a solar cell, in particular for improving any defective process execution which has generated excessively high contact resistances at the transition between the metal paste and the emitter layer of the silicon solar cell, by means of an alteration of the ohmic contact resistance. The capacity of the solar cell is enhanced accordingly.

In a solar module, it is also endeavored to achieve a lower and more stable contact resistance. Solar cells are therefore encapsulated in the solar module, in order to protect solar cells against external environmental influences during the service life of the solar module. Degradation mechanisms do still however occur in the operation of the solar module. For example, the penetration of moisture and UV light results in the formation of acetic acid which, in particular, attacks the front-surface electrode and/or the back-surface electrode. However, other degradation mechanisms can also result in a deterioration, or even a complete failure of electrical contact. Loss of contact substantially reduces the output power of a solar module.

Any improvement of solar module efficiency in a finished solar module associated with the improvement of semiconductor-metal contacts in the solar cells of a solar module is not known. In particular, no repair solution is known which, at solar module level, can improve serial losses which are caused by an increased metal-semiconductor resistance. Thus, for example, any thermal post-treatment of metal-plated contacts is not possible, on the grounds of the temperatures required which, for a number of other components of the finished solar module, would be excessively high. The materials of these components would be permanently damaged by thermal treatment of this type.

SUMMARY

The object of the present invention is therefore the provision of a method for repairing and/or optimizing a solar module by means of which the solar module capacity of the finished solar module is improved.

According to the invention, this object is fulfilled by a method having the features of patent claim 1. Advantageous further developments and modifications are disclosed in the sub-claims.

The invention relates to a method for repairing and/or optimizing a solar module having a sun-facing front, a sun-averted back, and a multiplicity of solar cells that are encapsulated between the front and the sun-averted back, comprising the following steps:

a) providing a solar module;

b) energization of the solar module thus provided, in a reverse direction, by the application of an electric voltage;

c) locally illuminating and scanning the front of the solar module to which the electric voltage is applied by means of a point light source, such that a current flux flows through the solar cells which are encapsulated in the solar module.

Localized illumination of the solar module in the reverse direction generates high current densities in the area of the illuminated region. This current is compelled to flow through the nearest contact. As a result of high resistance, e.g. in the event of impaired contact, localized heat is generated. In the event of sufficiently strong illumination, this heat initiates a further contact-forming reaction. Heat generation is exclusively localized in the effective contact region which, for example, comprises an area of less than 1 μm and, by means of rapid raster scanning, the time during which this region undergoes illumination and heat-up is limited. Accordingly, the solar cell thus illuminated does not undergo any significant heat-up in its entirety, resulting in any excessive thermal loading of solar module materials which surround the solar cell. The method includes repairs of further contact degradation mechanisms. The method permits a repair and/or optimization of a solar module which is already in service. The solar module can undergo the method in the field, i.e. the removal and transport thereof to a workshop is not necessary.

The point light source is preferably a laser.

In a preferred embodiment, step b) comprises the connection of an electrical contact element of the solar module to one pole of an electric voltage source, and the connection of a further electrical contact element of the solar module to another pole of the electric voltage source, and the application of an electric voltage in a reverse direction of the solar module, by means of the voltage source.

In addition to encapsulated solar cells, solar modules frequently comprise at least one bypass diode. The one or more bypass diodes which are present in the solar module are preferably removed or bridged prior to step b). Any potential tripping of the bypass diode(s) during step b) is prevented accordingly.

Preferably, between step a) and step b), a step aa) for the capture of at least one electroluminescence image of at least one part of the solar module is executed. The electroluminescent effect is employed for the identification of damage on the solar module. In order to execute an electroluminescence measurement, a voltage, in particular a DC voltage, is applied to the solar module, and light emitted in response to the voltage applied is captured by means of a capture device and rendered visible. Light radiation is based upon a process whereby electrons which are injected into the solar cells of the solar module recombine with available spaces, and the energy released in this process is emitted in the form of a photon. However, luminescent radiation emitted by silicon in solar cells is not visible to the human eye. A capture device is therefore employed, in order to generate a luminescence image. The capture device, for example, is a camera or preferably a near-infrared sensor. Cameras and near-infrared sensors which can be employed for this purpose are known.

Solar cells operate in a forward direction, in the event that a voltage is generated by the absorption of sunlight, which is converted into a direct current. However, solar cells can also function in an inverse or opposing direction, i.e. in a reverse direction. In electroluminescence measurement, a reverse energization is executed. In reverse energization, by means of a voltage source, a current is applied to the solar module string which flows in a reverse direction. Electromagnetic radiation is generated as a result, and the solar cells function as light-emitting diodes, such that the resulting radiation can be captured by means of the capture device. The solar module which is energized by the voltage in the reverse direction commences to illuminate, wherein defective regions are not illuminated. Dark regions can therefore be indicative of shadows. Solar cells which are defective in a reverse direction will also be defective in a forward direction.

An error pattern can therefore be rendered visible by means of the electroluminescence image, wherein impaired contact properties appear as dark. Preferably, further to the capture of one of more electroluminescence images, a classification and/or computer-supported further processing of the electroluminescence image(s) is executed. Consequently, in a preferred embodiment, a step ab) is executed between step aa) and step b) for the classification and/or computer-supported further processing of the at least one electroluminescence image thus captured.

Step ab) preferably comprises a classification of electrical contacts of the solar cells. Electrical contacts are particularly susceptible to degeneration and the resulting impairment of solar module capacity.

In a preferred embodiment, step ab) comprises a computer-supported further processing, in which defective or deficient electrical contacts of solar cells are identified. Computer-supported further processing comprises, for example, the employment of a self-learning algorithm, which identifies repairable errors in the electroluminescence image. Step c) preferably comprises the illumination and scanning of that part of the front of the solar module which is energized by means of the electric voltage in which at least one defective or deficient contact in the solar cells has been identified. In this manner, actually defective regions of the solar module are repaired and/or optimized, without the processing of undamaged regions. In particular, if the front-surface electrode is configured as a contact digit or a contact grid, this region is susceptible to degeneration.

Step c) is preferably executed in a subregion of the solar module. Preferably only that subregion of the solar module is processed by means of the point light source in which contact errors have been identified by reference to the electroluminescence image. If, further to step c), the capture of a further electroluminescence image is executed, the region which has been processed in step c), and thus repaired, will appear brighter in the electroluminescence image.

In a preferred embodiment, electrical contacts of the solar cells respectively represent electrical contacts of solar cells between a metal-plated section, particularly an electrical contact digit, and a semiconductor section of the respective solar cell. These are preferably the regions which are repaired and/or optimized by means of the method.

The solar module is preferably part of a solar module system which, in addition to the solar module, comprises at least one further solar module, which is electrically connected to the solar module. In this case, step a) comprises the release of the electrical connection of the solar module to the at least one further solar module, such that two contact elements of the solar module are connectable to an electric voltage source.

BRIEF DESCRIPTION OF THE DRAWINGS

The invention is described hereinafter with respect to exemplary embodiments, with reference to the figures. In each case, in a schematic representation which is not true-to-scale.

DETAILED DESCRIPTION

FIGS. 1 to 5 respectively represent a process step in a method according to the invention for repairing and/or optimizing a solar module, wherein the solar module is shown in a perspective overhead view, and the solar module 1 comprises a sun-facing front 6, an (unrepresented) sun-averted back and a multiplicity of (unrepresented) solar cells which are encapsulated between the front 6 and the sun-averted back. The solar module further comprises two electrical contacts 2.

Figure 1:
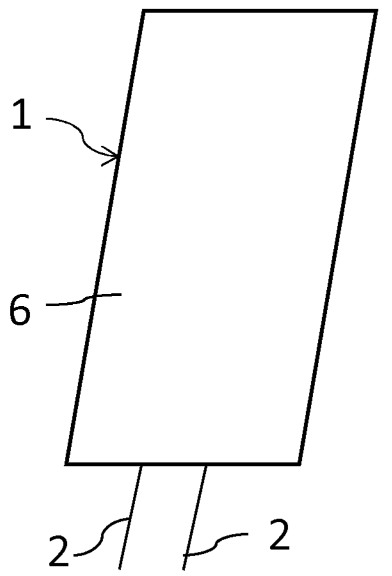
FIGS. 1 to 5 show process steps of a method according to the invention for repairing and/or optimizing a solar module.

FIG. 1 shows a step for providing a solar module. The solar module 1 is provided such that two contacts 2 are electrically connectable to an (unrepresented) further device or apparatus.

Figure 2:
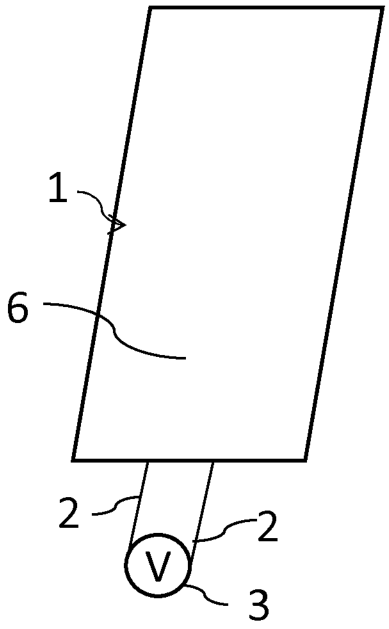

FIG. 2 shows a step for energizing the solar module 1 thus provided with an electric voltage, in a reverse direction, by means of a voltage source 3, both (unrepresented) poles of which are electrically connected to the two electrical contacts 2 of the solar module 1.

Figure 3:
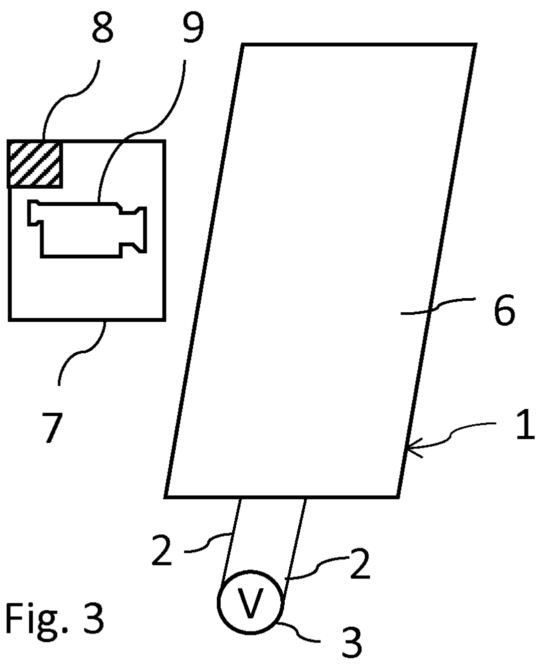

FIG. 3 shows an optional step for capturing at least one (unrepresented) electroluminescence image of at least one part of the solar module 1 by means of a capture device 9 while the solar module 1 is energized by a voltage, by means of the voltage source 3, and which is part of a capture and evaluation apparatus 7, which further comprises an evaluation apparatus 8.

Figure 4:
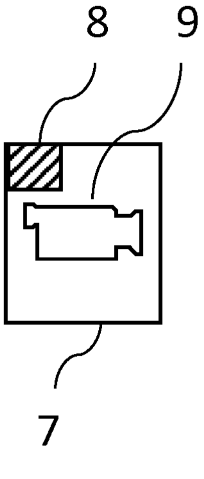

FIG. 4 shows an optional step for the classification and/or computer-supported further processing of the at least one (unrepresented) electroluminescence image thus captured by means of the evaluation apparatus 8. In the electroluminescence image, regions which appear as dark indicate damage in the solar module, whereas regions which appear as bright indicate undamaged regions of the solar module.

Figure 5:
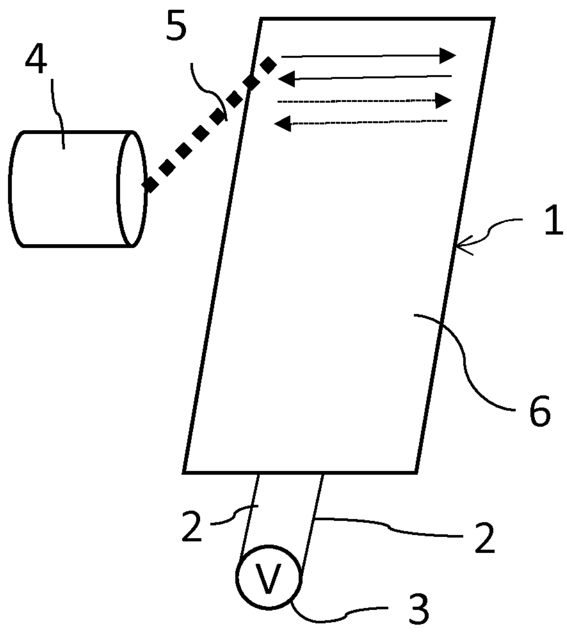

FIG. 5 shows a localized illumination and scanning of the front 6 of the solar module 1 which is energized by the electric voltage, by means of a point light source 4, such that a current flux flows through the solar cells which are encapsulated in the solar module 1. A direction of motion of scanning by means of the point light source 4 is indicated by arrows.

Figure 6:
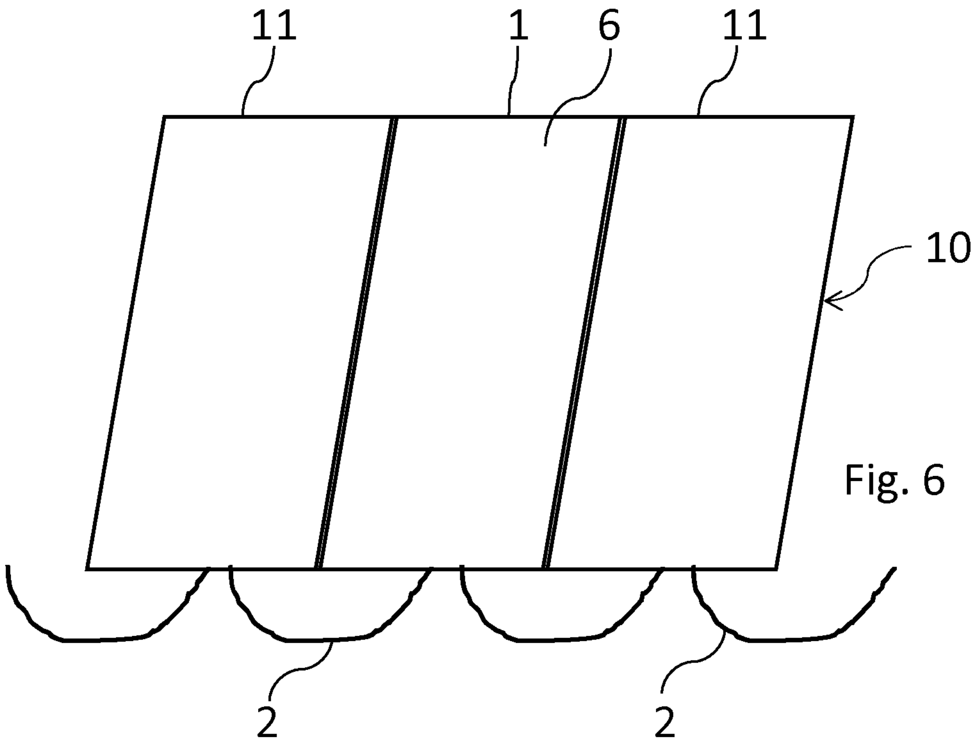
FIGS. 6 to 8 show a method according to the invention for repairing and/or optimizing a solar module system.
Figure 7:
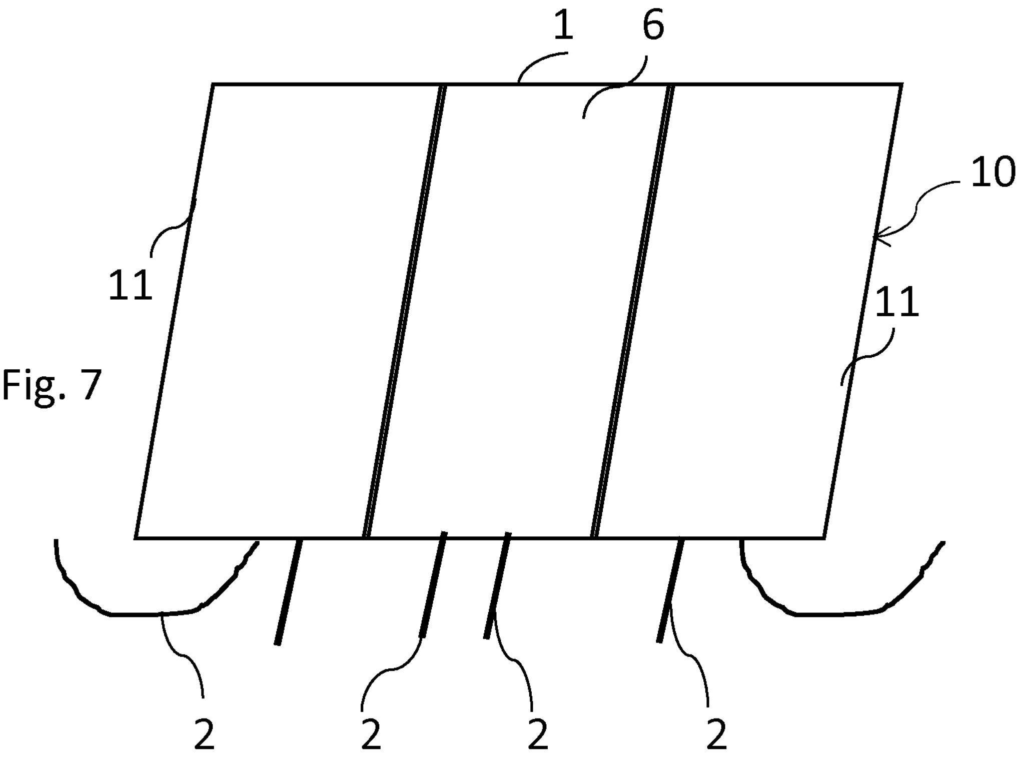
Figure 8:
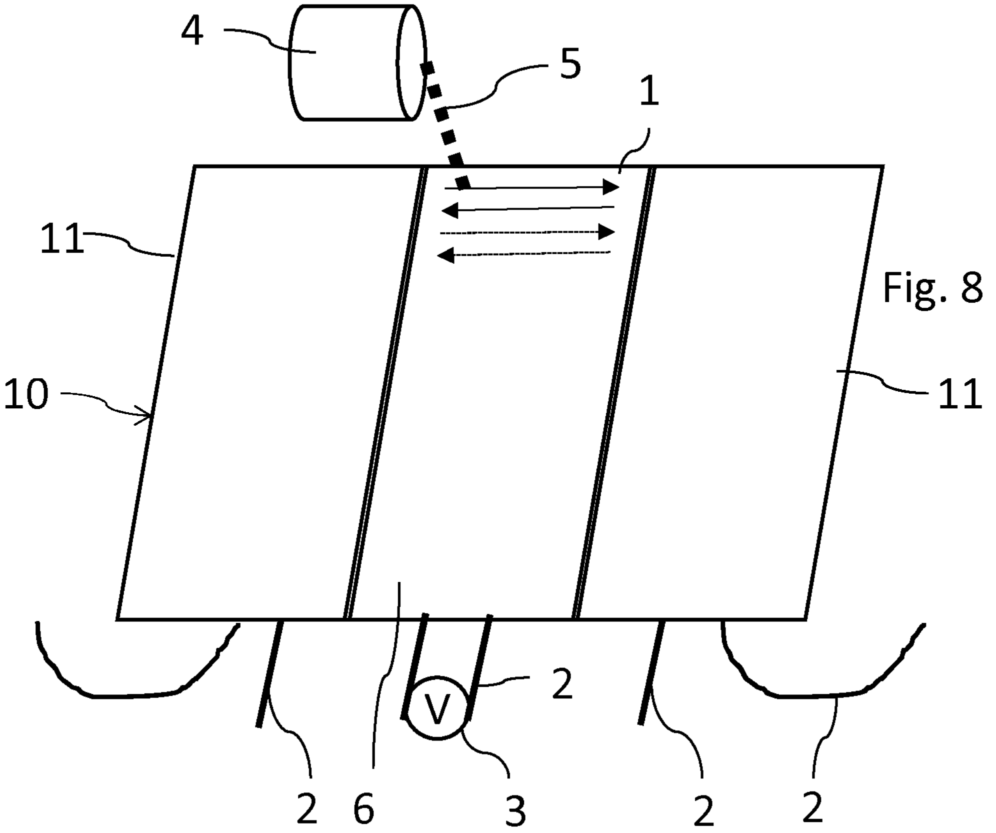

FIGS. 6 to 8 show a method according to the invention for repairing and/or optimizing a solar module system. The solar module system 10 comprises a solar module 1, and at least one or, for exemplary purposes only, two further solar modules 11, each of which is electrically connected to the solar module 1.

FIG. 6 shows the solar module system 10 in operation. The solar module 1 is respectively connected to each of the solar modules 11 via one of the contacts 2. The solar module 1 and the further solar modules 11 respectively comprise a sun-facing front 6, an (unrepresented) sun-averted back and a multiplicity of (unrepresented) solar cells which are encapsulated between the front 6 and the sun-averted back. In the event of the incidence of sunlight upon the front 6, the solar module 1 and the further solar modules 11 generate a current, which flows in a forward direction.

FIG. 7 shows a step for providing the solar module 1 by releasing the electrical connection of the solar module 1 to the two further solar modules 11, such that the two contact elements 2 of the solar module 1 are electrically connectable to an (unrepresented) electric voltage source. In other respects, the solar module 1 remains arranged in place between the two further solar modules 11.

FIG. 8 shows a step for energizing the solar module 1 thus provided with an electric voltage, in a reverse direction, by means of a voltage source 3, both (unrepresented) poles of which are electrically connected to the two electrical contacts 2 of the solar module 1, and a simultaneous step for the localized illumination and scanning of the front 6 of the solar module 1 which is energized by the electric voltage, by means of a point light source 4, such that a current flux flows through the solar cells which are encapsulated in the solar module 1. A direction of motion of the point light source 4 is indicated by arrows.

LIST OF REFERENCE NUMBERS

1 Solar module
2 Contact element
3 Voltage source
4 Point light source
5 Light beam
6 Front
7 Capture and evaluation apparatus
8 Capture device
9 Evaluation apparatus
10 Solar module system
11 Further solar module

The invention claimed is:

1. A method for repairing and/or optimizing a solar module having a sun-facing front and a sun-averted back, wherein a multiplicity of solar cells are encapsulated between the front and the sun-averted back, comprising the following steps:

a) providing a solar module;

b) energizing the solar module in a reverse direction by the application of an electric voltage;

c) identifying a damaged region of the solar module based on the energization of the solar module in the reverse direction;

d) after identifying the damaged region, energizing the solar module in the reverse direction by the application of the electric voltage to the solar module while simultaneously locally illuminating and scanning the identified damaged region of the solar module with a point light source, such that a current is induced in the solar module at the identified damaged region, the current having a current density of 200 $A/cm^2$ to 20,000 $A/cm^2$, thereby improving capacity of the solar module at the identified damaged region.

2. The method as claimed in claim 1, wherein step b) comprises the connection of an electrical contact element of the solar module to one pole of an electric voltage source, and the connection of a further electrical contact element of the solar module to another pole of the electric voltage source, and the application of an electric voltage in a reverse direction of the solar module.

3. The method as claimed in claim 1, wherein any bypass diode(s) which is/are present in the solar module is/are removed or bridged prior to step b).

4. The method as claimed in claim 1, wherein identifying a region of the solar module that is damaged includes capturing at least one electroluminescence image of the identified region of the solar module.

5. The method as claimed in claim 1, wherein step d) is executed on a front of the solar module.

6. The method as claimed in claim 1, wherein the solar module:

is part of a solar module system which, in addition to the solar module, comprises at least one further solar module, which is electrically connected to the solar module, and step a) comprises a release of the electrical connection of the solar module to the at least one further solar module, such that two contact elements of the solar module are connectable to an electric voltage source.

7. The method as claimed in claim 1, wherein step d) generates localized heat at the identified damaged region thereby repairing a deficient or degraded electrical contact of the solar module.

8. The method of claim 1, wherein illuminating and scanning the identified damaged region includes illuminating and scanning the identified damaged region for between 10 ns and 10 ms.

9. The method as claimed in claim 4, further comprising classifying the at least one captured electroluminescence image and/or computer-supported processing of the at least one captured electroluminescence image.

10. The method as claimed in claim 9, wherein classifying the at least one captured electroluminescence image comprises classifying the at least one captured electroluminescence image based on electrical contacts of the multiplicity of solar cells of the solar module.

11. The method as claimed in claim 9, wherein computer-supported processing includes identifying defective or deficient electrical contacts of one or more solar cells in the identified region, and locally illuminating and scanning the identified damaged region includes illuminating and scanning the defective or deficient electrical contacts.

12. The method as claimed in claim 10, wherein the electrical contacts respectively represent electrical contacts of solar cells between a metal-plated section, and a semiconductor section of the respective solar cell.

13. The method as claimed in claim 12, wherein the electrical contacts of the solar cells comprise digit electrodes.

14. The method of claim 7, wherein the localized heat is generated in an area of less than 1 μm.

* * * * *